3,204,479
VALVE OPERATOR WITH DUAL GEARING
John P. Magos, Wilmette, Ill., assignor to Crane Co.,
Chicago, Ill., a corporation of Illinois
Filed Sept. 20, 1963, Ser. No. 310,334
7 Claims. (Cl. 74—423)

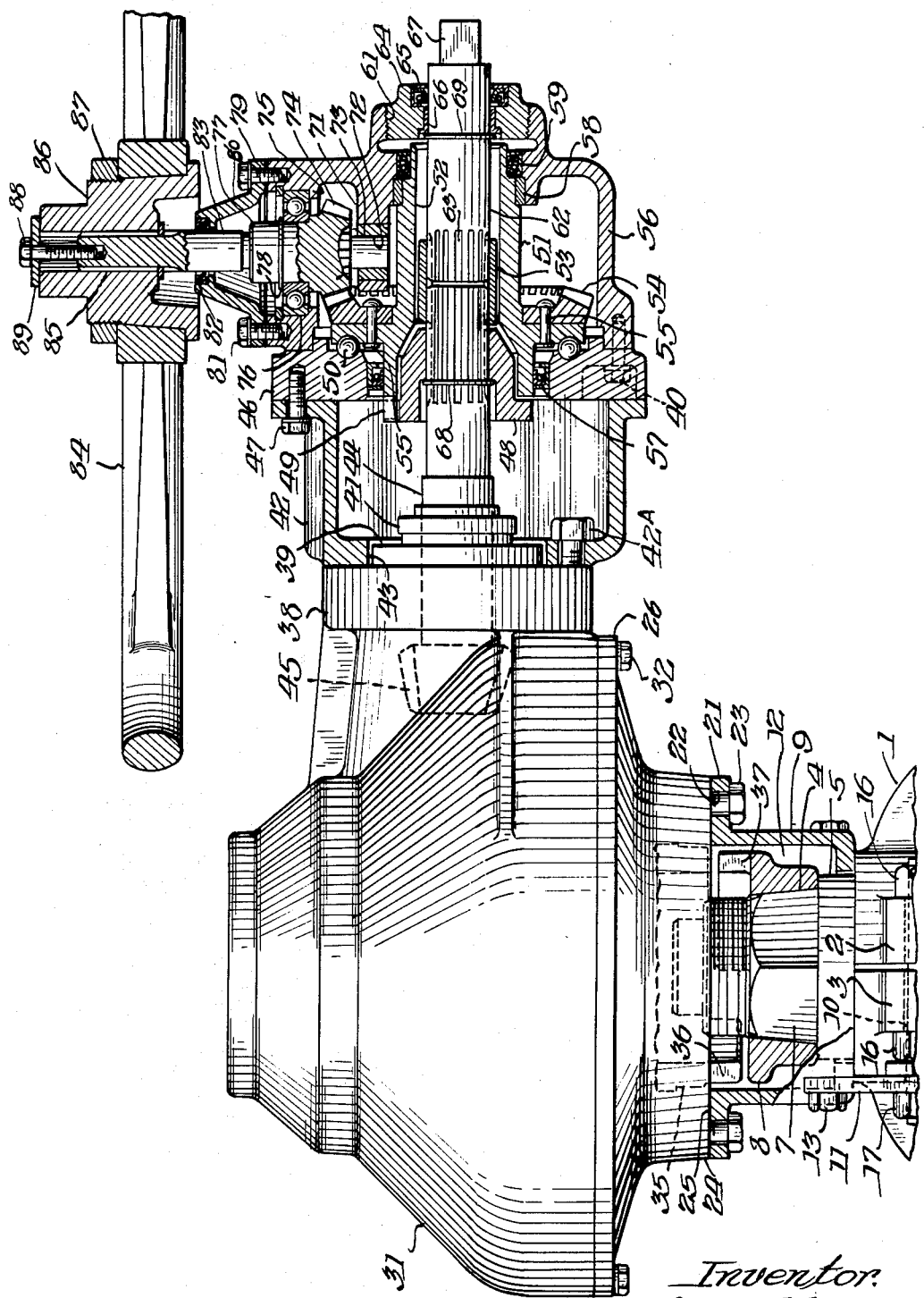

This invention relates generally to valve actuating means or the like, and, more particularly, it is concerned with an improvement over the type of detachable valve actuating means shown and described in U.S. Patent No. 3,034,371, granted May 15, 1962.

In order to acquire a better understanding and appreciation of the instant contribution, it should be realized that there has long been a need for providing a greater gear reduction in facilitating improved mechanical advantages than are currently provided in the type of mechanism shown in the said patent. The said needs in the field develop largely upon encountering not only the operation of larger valves but also such valves in which greater torque or power output become necessary, say, a gear ratio of the order of 18 or 20 to 1. This makes it desirable for the pipe line operator or attendant to use a series arrangement of gearing with the high gear ratio in order to obtain maximum power for seating and unseating the valve. In addition, the current arrangement permits the operation of the valve through an extension shaft, for example, one employing the first or primary arrangement of gearing shown and described in the said patent.

Therefore, it is one of the more important objects of this invention in meeting the need for higher gear ratios of the order above referred to that spiral bevel gears be employed in the valve operator constituting an improvement over the construction in the said patent. This arrangement has a decided advantage over a worm or worm gear, realizing that in the latter connection a worm or worm gear has an extremely low efficiency, while spiral bevel gears have a very high efficiency.

Therefore, it is an important object of this invention that the combination of two such gear units as hereinafter described permits the arrangement of two speeds and two ratios for optimum manual valve operation.

More specifically, the combination of a gear ratio of the order of say 3 to 1 with those having a ratio of say 6 to 1 provides for desirable valve operation in economically accomplishing the achievement of high gear ratios by using stock gear units in series.

Another object is to provide for a combination of two gear units as above referred to in which the series or dual assemblies of the units permit the secondary units to be mounted so that the handwheel may be arranged either horizontal or vertical or in any intermediate position desired, since the secondary unit of this invention may be installed with relation to the gearing of the primary unit to the desired position.

It is therefore a further important object to provide a gear unit in which the shaft of the primary gear arrangement can be extended so as to cooperate with the secondary gear arrangement thereby permitting dual operation on two different gear ratios and at two different speeds of operation. This arrangement has the advantage above referred to in obtaining maximum seating and unseating torque loads and also higher speeds as selected during the opening and closing movements of the valve.

Another object is to provide an economical and convenient means of operating a valve through a gear train by either handwheel operation or by means of portable fluid or electric motor drives, or both, as desired, depending upon the actuation problems encountered in the field requiring suitable adaptation in valve operation.

Other objects and advantages of this invention will become more readily apparent upon proceeding with the following description read in light of the accompanying drawing in which the single figure shows a fragmentary sectional assembly of a dual gear mounting embodying this invention.

Referring now to the figure, a conventional split type valve yoke designated 1 is shown, having the split hub construction as indicated at 2 and 3. The purpose of the split hub construction is to permit reception of the flanged yoke sleeve 4 having the upper flange 5 and a lower flange (not shown) as indicated in said patent to prevent axial movement of the said yoke sleeve. The upper portion of the yoke sleeve 4 is preferably polygonally formed at 7 in order to receive in non-rotatable relation thereto the yoke sleeve adapter 8. A cooperating yoke adapter 9 of substantially cup-like configuration is mounted on the yoke as shown, the said latter adapter being provided with a chamber 12 within which the yoke sleeve adapter 8 and the yoke sleeve 4 are received as shown. The said yoke adapter 9 cooperates with the split yoke construction by means of depending removable plates 11 attached by means of the bolts 13 to the yoke adapter as shown, the plates being bolted as at 16 and 17 to the projecting ears of the yoke. Thus, it will be clear that the yoke adapter 9 is firmly held against axial and rotational movement by means of the connections with the extension bolt 10, the nuts 16 engaging the split hub construction of the yoke as shown at 2 and 3 respectively. Preferably at its upper annular portion, the yoke adapter member 9 is flanged as at 21 and is also provided with suitable bolt holes 22 to receive the cap screws 23 to allow for the mounting flange 24 to be received thereon and supported on the upper surface 25. The upper flange portion 26 of the mounting flange 24 is preferably of circular configuration and is tapped to receive the annularly disposed cap screws 32, the driver housing 31 being held in place on the mounting flange by means of the cap screws 32. It will be understand as shown more clearly in said patent that the mounting flange 24 is suitably formed to receive the depending shank portion of the drive sleeve 35. It will also be noted that the said drive sleeve at its lower portion is annularly recessed whereby to provide the engaging means or clutch formed with an annular abutment as at 36 to fit in spaced annular relation thereto and engages a similarly formed abutment 37 thereby to provide therebetween the clutch means for the yoke sleeve adapter 8.

In view of the remainder of the construction within the housing being identical to that shown and described in said patent, and since it performs the same function, it is deemed unnecessary to show the structural details therewithin and repeat the description thereof. At the end portion of the housing 31, as indicated, an integral flange 38 is provided. Within said flange, a suitable roller bearing 39 and an adjusting bushing 41 for said bearing is mounted to extend within a hollow gear unit flange adapter 42 of cup-shaped configuration as indicated, the said bearing and bushing being received within the aperture 43 as shown. The driving shaft 44 being rotatable transmits such rotation to the gearing forming the primary unit contained within the housing 31, and shown in detail in said patent. This is accomplished by means of the pinion gear shown in dotted lines and indicated at 45 whereby the drive sleeve 35 by means of said pinion gear cooperating with the gearing (not shown). The latter is driven in the same manner as described in connection with said patent. The hollow gear unit adapter 42 is firmly attached by means of the cap screws 42A to the integral flange 38 of the housing 31.

The multiple gearing arrangement of this invention resides in the structural elements and gearing hereinafter to be described in connection with the adapter member 42.

A side cover 46 is mounted as shown, being attached to the member 42 by means of the cap screws 47. Extending from the shaft 44 in non-rotatable relation thereto is the internally splined adapter 48, the latter member having a lost motion or hammerblow engagement as indicated at the annular lug 49 cooperating with the bevel ring gear carrier 51 by suitable predetermined engagement with a similar lug indicated on said ring gear carrier, the latter member being hollow as at 52 to receive the internally splined coupling 53. In non-rotatable and in firmly bolted abutting relation to the member 51, the bevel ring gear 54 is attached to the flanged portion of the said gear carrier 51 as indicated by means of the rivets 55 annularly disposed.

Enclosing the bevel ring gear 54 and the gear carrier 51, a gear housing 56 is provided with the oil seal 57 for cooperation with said gear carrier at one end thereof and with the renewable bearing 58 and the oil seal 59 at the opposite end of the said housing. Preferably, the housing 56 is closed by a conventional pipe plug (not shown) engaging the pipe threads 61 in a fluid sealing manner.

However, in some cases, it is desirable to provide for a portable motor drive or for repositioning of the operating handwheel. In such cases, an extension shaft 62 may be employed engaging the said splined coupling 53 by means of its splines as at 63, in which case a threaded bushing 64 will be used as illustrated, having the oil seal 65 and the renewable bearing 66 for the said shaft. The shaft 62 on its outer end limit is provided with a polygonal portion 67 for engagement by either a handwheel or selectively by a suitable portable motor, such as an air driven or electrically driven type. To inhibit the inner shaft 44 against axial movement inwardly, a split or snap ring 68 may be used for such purpose. A similar construction is employed at 69 for positioning the extension shaft 62.

At the upper portion of the housing 56, an inwardly projecting shelf or transverse wall 71 is provided, being suitably apertured to receive the bearing 72 for engagement of the extension bearing portion 73 of the pinion bevel gear 74. Superposed above the wall 71, an annularly shouldered portion 75 receives the ball bearing 76, the latter being apertured to receive the shaft portion 77 of the bevel pinion gear 74. For the same reason as previously described, a snap ring 78 is applied on the shaft portion 77. The chamber immediately above the housing portion 75 is capped by means of the oil seal cover 80 being attached thereto by means of the cap screws 81. The said cover is preferably provided with the oil seal 82 for the outer shaft portion 83 of said pinion gear.

Attached in non-ratatable relation to the shaft portion 83, a handwheel 84 is mounted upon the splined or otherwise polygonal portion 85 over the handwheel adapter 86, the latter member being provided with an adapter wheelnut 87 to retain the handwheel 84 firmly in position on the handwheel adapter as shown. In order to retain the handwheel 84 and the adapter 86 in place, a cap screw 88 and the cap screw washer 89 are used.

In facilitating the rotation of the bevel ring gear 54 in relation to the side cover 46, roller ball bearings 50 are preferably used as indicated. The gear housing 56 is attached to the side cover 46 by means of a plurality of cap screws 40 shown in dotted lines.

In considering the operation of the actuating mechanism of this invention, it will now be apparent that upon rotation of the handwheel 84, rotative motion is thereby imparted through the pinion gear 74 to the bevel ring gear 54 whereby to rotate the ring gear carrier 51. This motion in turn results in the rotation of the splined adapter 48. The latter member is mounted in non-rotatable relation to the shaft 44. Preferably, it has hammerblow or lost motion lugs as indicated at 49 to impart rotation of carrier 51 subsequently to the shaft 44 and to the integral pinion bevel gear 45 indicated in dotted lines within the housing 31. It will, of course, be appreciated as previously pointed out that the remainder of the gearing (not shown) within the housing is similar to the construction shown in Patent No. 3,034,371.

However, a principal mechanical advantage of this invention is imparted by reason of employing say a 6 to 1 ratio within the gearing in the housing 31 and an additional ratio of 3 to 1 being imparted through the gears within the housing 56, so as to thereby obtain an over-all or total gear ratio of 18 to 1. This arrangement provides for a greater gear reduction than has heretofore been present in valve operating devices. Thus, it permits of a flexibility embodying bevel gearing applicable to wider usage in valves in a convenient and economical manner beyond that heretofore available.

As pointed out, in the alternate construction illustrated employing the extension shaft 62, the handwheel 84 if desired may be mounted directly on the extension shaft 62 at 67 or else an air motor or electric motor actuator can be applied directly to the polygonal portion 67 whereby to facilitate operation of the valve by other than manual means. The advantage resides in the flexibility of the consruction herein permitting interchangeability to the extent that if desired the upper splined portion of the outer shaft portion 85 may be provided with a polygonal attachment means for use with a portable actuator as above referred to. It will also be understood that when a portable actuator is applied at the polygonal portion 67 of the shaft 62 the 6 to 1 ratio (or any other suitable gearing) is employed, enabling more rapid operation of the valve.

It will also be apparent that embodiments of the invention in the alternative have been illustrated and described, and this has been done in an effort to set forth the versatility of the invention in its application to a wide variety of valves regardless of whether a rising or non-rising stem is used, or whether a split yoke or a ball bearing yoke sleeve construction is employed. Thus it should be clear that the invention is capable of application to many other forms not herein specifically described or referred to. The scope of the invention should be measured by the appended claims, considered in light of the art to which it relates.

I claim:

1. In a valve actuator construction suitable for manual operation, the actuating means therefor including a valve stem and yoke, a stationary adapter element removably attached upon removal of a portion of the initial actuating means of the valve, a housing for journally supporting an outer end portion of said stem, gear means within said housing for predeterminately moving said stem, a shaft journaled in the said housing substantially perpendicular to the axis of the said valve stem, a hollow flange adapter attached to an end portion of the said housing to enclose at least a portion of said shaft, a sleeve-like adapter snugly enclosing an outer end portion of said shaft in non-rotatable hollow ring gear carrier enclosing a portion of said shaft and sleeve like adapter, engagement means between said sleeve-like adapter and said gear carrier, a bevel ring gear mounted on said gear carrier, a bevel pinion gear for driving said bevel ring gear, said pinion gear having a shaft extension for engagement by outside actuating means, and a combined side cover and second housing for said gears, adapter and gear carrier attached to said hollow flange adapter.

2. The subject matter of claim 1, said gear carrier being in telescoped relation to said sleeve-like adapter, said engagement means being positioned at an end portion of said telescoped relation.

3. The subject matter of claim 2, the said telescoped relation providing for a lost motion hammerblow means of engagement between said sleeve-like adapter and gear carrier.

4. The subject matter of claim 2, said pinion gear shaft extension projecting from said combined side cover and housing, said engagement means cooperating with splines on said sleeve-like adapter and said first named shaft.

5. The subject matter of claim 1, said shaft perpendicular to the axis of said valve stem having co-axial shaft extension means projecting through said second housing, means on said co-axial shaft extension means for effecting actuation of said shaft extension means and said valve stem.

6. The subject matter of claim 5, said shaft perpendicular to the axis of said valve stem having renewable coupling means between said shaft and said co-axial shaft extension.

7. The subject matter of claim 6, said coupling means being positioned between said sleeve like adapter and said extension shaft means within said hollow ring gear carrier.

No references cited.

DON A. WAITE, *Primary Examiner.*